(12) United States Patent
Frey, Jr.

(10) Patent No.: US 11,460,272 B1
(45) Date of Patent: Oct. 4, 2022

(54) DUAL MODE SEMI-ACTIVE LASER SEEKER AND IMAGING SYSTEM

(71) Applicant: BAE SYSTEMS Information and Electronic Systems Integration Inc., Nashua, NH (US)

(72) Inventor: Robert D. Frey, Jr., Bolton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 329 days.

(21) Appl. No.: 16/666,703

(22) Filed: Oct. 29, 2019

(51) Int. Cl.
*F41G 7/22* (2006.01)
*F41G 7/00* (2006.01)

(52) U.S. Cl.
CPC ........... *F41G 7/2293* (2013.01); *F41G 7/008* (2013.01); *F41G 7/226* (2013.01); *F41G 7/2226* (2013.01); *F41G 7/2253* (2013.01)

(58) Field of Classification Search
CPC ............. F41G 7/22–2293; F41G 7/008; F41G 7/2226; F41G 7/2253; F41G 7/226
See application file for complete search history.

(56) References Cited

U.S. PATENT DOCUMENTS

| | | | | |
|---|---|---|---|---|
| 6,111,241 A | * | 8/2000 | English | G01S 7/486 250/203.2 |
| 6,288,383 B1 | * | 9/2001 | Urbach | G01S 7/4811 250/201.5 |
| 8,049,869 B2 | * | 11/2011 | Flowers | F41G 7/226 356/29 |
| 8,207,481 B2 | * | 6/2012 | Taylor | F41G 7/226 244/3.16 |
| 10,126,101 B2 | * | 11/2018 | Ell | F41G 7/2293 |
| 2010/0127174 A1 | * | 5/2010 | Tener | F41G 7/008 250/339.02 |
| 2010/0290038 A1 | | 11/2010 | Frey, Jr. et al. | |
| 2011/0073704 A1 | | 3/2011 | Jenkins et al. | |
| 2013/0087684 A1 | * | 4/2013 | Guetta | F41G 3/02 250/208.1 |
| 2014/0231576 A1 | | 8/2014 | Rinker | |
| 2017/0219693 A1 | * | 8/2017 | Choiniere | H04N 5/332 |
| 2020/0256643 A1 | | 8/2020 | Schorr et al. | |

OTHER PUBLICATIONS

International Search Report, PCT/US20/57489, dated Jul. 22, 2021, 7 pages.

* cited by examiner

*Primary Examiner* — Matthew M Barker
(74) *Attorney, Agent, or Firm* — KPIP Law, PLLC; Gary McFaline

(57) ABSTRACT

The system and method of a dual mode semi active laser seeker and imaging system using pulse detection and angle determination as applied to quad detectors to properly identify a correct designator spot. The angle performance is driven by the field of view of the imaging system. The imaging system resolution provides the required angle accuracy for guidance as cued by pulse detection apertures. The imaging system eliminates the need to designate until impact thus eliminating exposure to counter fire against the designator. The elimination of designation until impact also opens up the opportunity rapid engagement of multiple targets from a single designator.

13 Claims, 7 Drawing Sheets

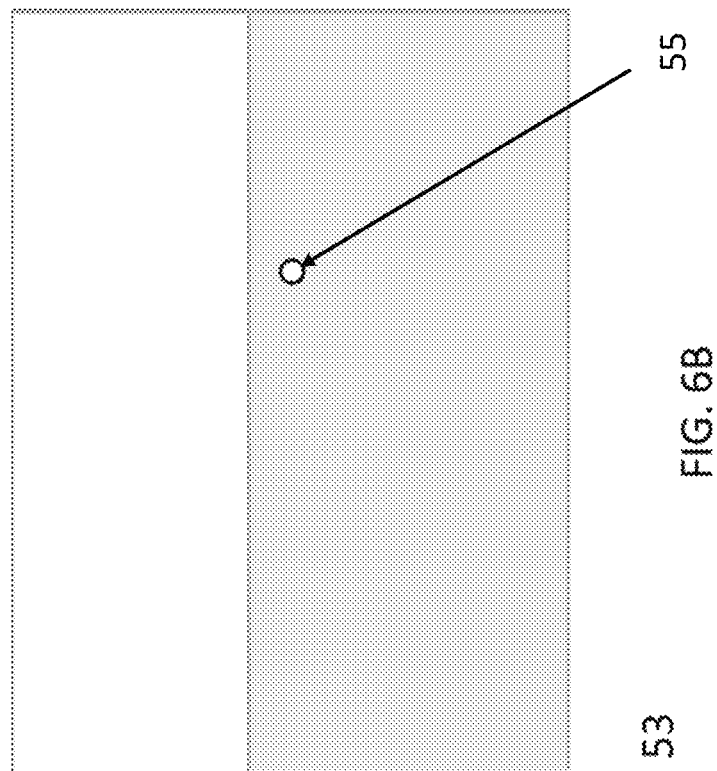
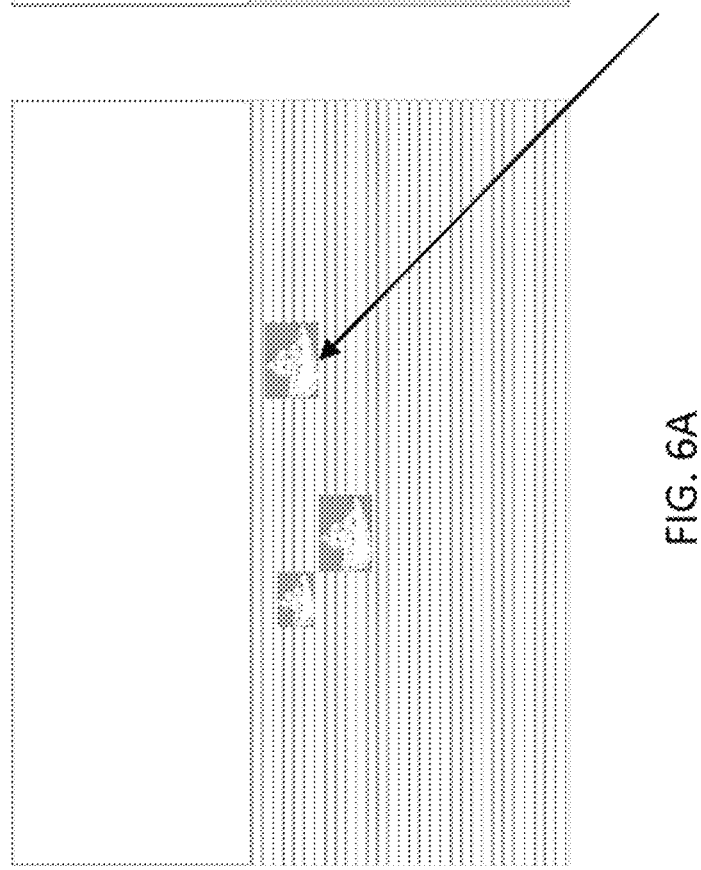

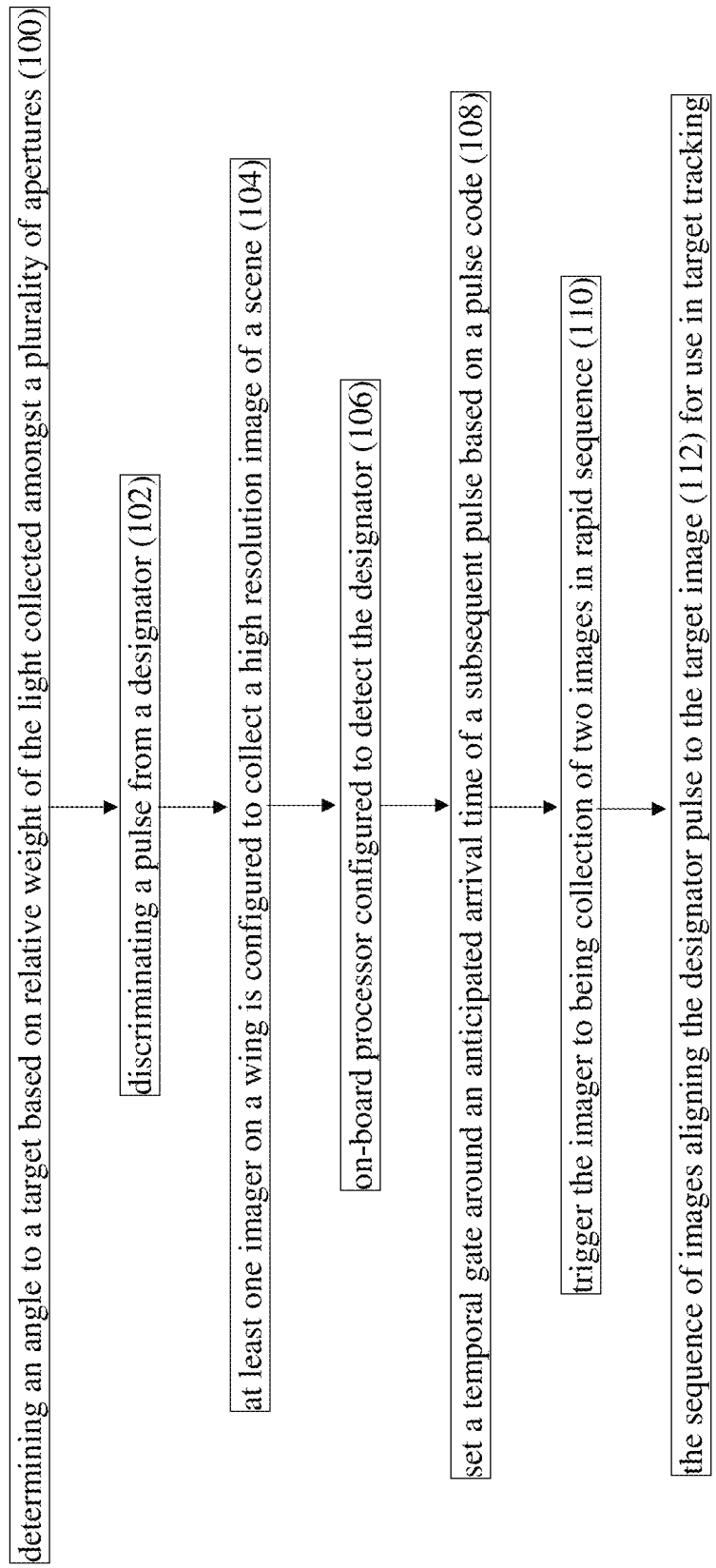

DUAL MODE SEMI-ACTIVE LASER SEEKER AND IMAGING SYSTEM

FIELD OF THE DISCLOSURE

The present disclosure relates to target tracking and more particularly to the use of a dual mode semi active laser seeker and imaging system.

BACKGROUND OF THE DISCLOSURE

Guided munitions, rounds or projectiles typically use designators for at least some portion of guiding the round to the target. Current designator systems require that the designator remain on the target until the impact of the round. This places the system designating the target at risk of detection and counter engagement. It also limits the ability of the designating system to rapidly engage multiple targets.

An additional shortcoming of the current approaches relates to strap down sensors. The boresight of a strap down seeker remains fixed relative to the axes of the projectile. Unlike a non-strap down system, such as a sensor mounted to a gimbal, the angle measurement accuracy of the sensor is driven by pixel count and the desired field of view for the system. If acquisition requires a large field of view due to uncertainty in target position or large lead angles to the target in order to intercept, a larger number of pixels are required to achieve a desired accuracy in the measurement of the angle and/or angle rate to target. Every pixel would require high bandwidth pulse detection processing in order to properly sense, discriminate, and measure the spread of the target energy to establish angle to target.

Wherefore it is an object of the present disclosure to overcome the above-mentioned shortcomings and drawbacks associated with the conventional target tracking systems.

SUMMARY OF THE DISCLOSURE

One aspect of the present disclosure is a dual mode target tracking system, comprising: a round comprising a plurality of wings, wherein each wing has an aperture configured to collect light and discriminate a pulse from a designator, the light being used to determine an angle to a target based on relative weight of the light collected amongst the plurality of apertures; at least one of the plurality of wings having an imager configured to collect a high resolution image of a scene; and an on-board processor configured to: detect the designator; set a temporal gate around an anticipated arrival time of a subsequent pulse based on a pulse code; and trigger the imager to being collection of at least two images in rapid sequence, a first or pulse image, having a short integration time, to capture a designator pulse against a background, a second or target image, having a longer integration time, to capture both feature and target detection, the sequence of images aligning the designator pulse to the target image.

In one example the current approach uses a minimal number of pixels for pulse discrimination and cues a high density imaging array to establish angle to target.

One embodiment of the system is wherein changes in the scene orientation between a designator frame and one or more scene frames are compensated for using one or more on-board inertial sensors.

Another embodiment of the system is wherein the plurality of apertures is four.

Yet another embodiment of the system is wherein the short integration time is set to 100 nanoseconds, 5× the designator pulse width of 20 nanoseconds, in order to ensure that the short designator pulse is not lost against shot noise due to accumulated background.

Still yet another embodiment of the system is wherein the longer integration time is collected immediately after the first image and the integration time for this image is set based on an automatic gain control process that ensures that the imager is not saturated due to ambient light conditions. The longest integration time is limited by the pulse repletion frequency, typically 20 Hz.

Another aspect of the present disclosure is a method for dual mode target tracking, comprising: providing a round comprising a plurality of wings, wherein each wing has an aperture; collecting light to determine an angle to a target based on relative weight of the light collected amongst the plurality of apertures; discriminating a pulse from a designator; providing at least one imager on a wing the imager being configured to collect a high resolution image of a scene; and providing an on-board processor configured to: detect the designator; set a temporal gate around an anticipated arrival time of a subsequent pulse based on a pulse code; and trigger the imager to being collection of two images in rapid sequence, a first or pulse image, having a short integration time, to capture a designator pulse against a background, a second or target image, having a longer integration time, to capture both feature and target detection, the sequence of images aligning the designator pulse to the target image.

One embodiment of the method is wherein changes in the scene orientation between a designator frame and one or more scene frames are compensated for using one or more on-board inertial sensors.

Another embodiment of the method is wherein the plurality of apertures is

Yet another embodiment of the system is wherein the short integration time is set to 100 nanoseconds, 5× the designator pulse width of 20 nanoseconds, in order to ensure that the short designator pulse is not lost against shot noise due to accumulated background.

Still yet another embodiment of the method is wherein the longer integration time is collected immediately after the first image and the integration time for this image is set based on an automatic gain control process that ensures that the imager is not saturated due to ambient light conditions. The longest integration time is limited by the pulse repletion frequency, typically 20 Hz.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 6A and FIG. 6B are diagrammatic representation of a pulse image and a target image, respectively, according to the principles of the present disclosure.

FIG. 7 is a flow chart of one embodiment of a method of the present disclosure.

DETAILED DESCRIPTION OF THE DISCLOSURE

Figure 1:
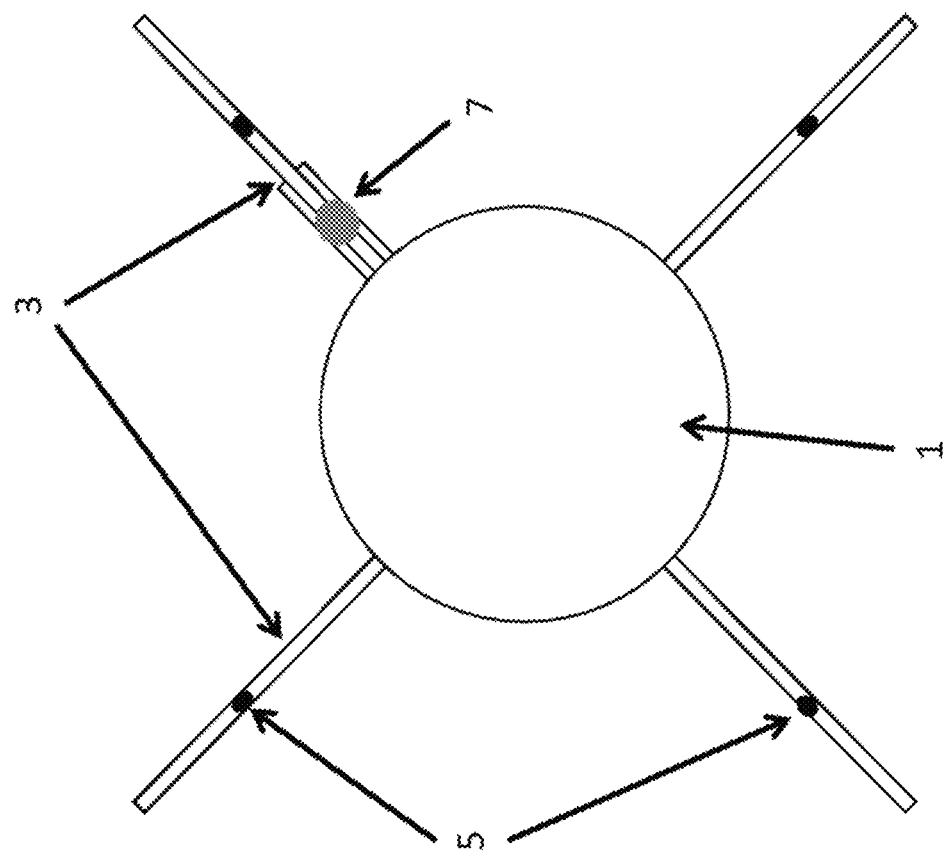
FIG. 1 shows a cross-sectional diagram of one embodiment of a dual mode semi active laser seeker and imaging system according to the principles of the present disclosure.

Semi-active laser seekers generally require a designator to remain trained on a target until a round makes contact with the target. This makes a designation system vulnerable to counter fire throughout the engagement. The location of designation can easily be detected using a camera that is sensitive to the lasing frequency used. Because the wavelengths commonly used by designators are well known such a camera is easily designed.

In one embodiment of the present disclosure, a dual mode seeker and imaging system employs an imaging array to detect a designation spot and image the surrounding scene. In certain embodiments of the system, a means of cuing a weapon to a particular target via the designator, allows the round to identify the target while the designator is active and then track the target to interception once the designator has been removed. One consideration with such a scheme is the proper identification of the designator amongst other designators and/or countermeasures. In certain embodiments, a round is a weapon, a projectile, a ballistic, a bullet, a munition, a guided weapon, or the like.

This approach utilizes techniques for pulse detection and angle determination as applied to quad detectors, or the like, in order to properly identify the correct designator spot. Angle performance is not typically dictated by guidance requirements, it is generally driven by the field of view of the imaging system. The imaging system resolution provides the required angle accuracy for guidance as cued by the pulse detection apertures. The dual mode seeker and imaging system of the present disclosure eliminates the need to designate until impact, thus eliminating exposure to counter fire against the designator. The elimination of designation until impact also opens up the opportunity of rapid engagement of multiple targets from a single designator.

In one embodiment, temporal pulse discrimination ensures that the round is cued to the target of interest. The process of pulse discrimination is established within the military and semi-active laser designator seekers implement these proven techniques. Correct selection of the designator is important in situations where multiple weapon systems are designating individual targets in the field of view. It is also ensures that the round is not fooled by a countermeasure. In certain embodiments, a pulse sequence is keyed to a specific pulse repetition frequency and/or a time varying pulse period. There are tight requirements on the timing required to ensure the round is tracking the correct target. Due to the pulse width of the designator pulse, the temporal response of the pulse on the detector has to be sampled at no less than about 10 MHz. In certain embodiments, sample pulse shape is then used to determine amongst multiple returns which is the correct pulse. Typically, this type of processing is applied to low pixel count arrays which couple this pulse detection with centroid calculations in order determine angle and angle rate of the target.

In one embodiment, an imaging array is designed to both discriminate a specific designator pulse code and image the scene. In some cases, the imaging array requires a dual ROIC (Read Out Integrated Circuit) that provide two modes of operation: temporal pulse discrimination and image generation. The sampling rate and subsequent pulse processing place heavy demands on the ROIC design and the processing electronics due to the pixel density required to form a corresponding image. In one example an imaging array with sensitivity to the laser designator is used, however the processing required to ensure the proper designator is selected can be extensive.

A typical approach to inexpensive semi-active laser seekers is to use a quad-cell array. The quad-cell has the temporal response required for pulse discrimination and provides angle to target information based on the weighting of the responses from each of the four pixels. There is a unique angle dependence to the intensity distribution on the array. However, constraining the detector to four pixels limits the field of view because the angle accuracy is dependent on both the instantaneous field of view (IFOV) of the detector and the amount of light collected by the detector from the scene background. Increasing the IFOV increases the observed background which increases the shot noise which reduces SNR and increase angle noise. In order to meet both field of regard and range requirements quad cell arrays are typically mounted to gimbals. Alternatively, the IFOV is reduced by adding more pixels resulting in additional processing load and cost. If additional pixels are not added, the angle noise, which is a combination of centroiding error and temporal error introduced by shot noise, can drive the angle reporting error to exceed guidance requirements.

One embodiment of the present disclosure combines the simplicity of a quad cell and the density of an imager. A four pixel array is used to sense the pulse sequence. The four pixels are processed in order to determine a coarse direction to the target. An image with a narrower field of view is then oriented such that the target can be observed. The temporal processing used to detect the designator sets gates around the anticipated arrival time of the subsequent pulse based on the pulse code selected for the engagement. This gate is used to trigger the imager to begin collection of two images in rapid sequence. A short integration time would be ideally set to match the gate period, which is classified.

A first image uses a short integration time in order to optimally capture the short designator pulse against the background. Short integration time, as used herein, is sized to encompass the 20 nanosecond designator pulse at perhaps 10× its nominal width. This eliminates the loss of the short designator pulse return against shot noise due to accumulated background. A second image, with a longer integration time, is collected immediately after the first image. The integration time for this image is optimized for both feature and target detection. Optimally the integration time is set based on an automatic gain control process that ensures that the imager is not saturated due to ambient light conditions.

The maximum integration period for the image capture is dictated by the pulse repetition frequency, typically 20 Hz. A rapid sequence of images are captured to ensure that the designator pulse is aligned to the image as both frames share the same aperture and detector. Changes in the scene orientation between designator frame and scene frame can be compensated for using on-board inertial sensors, or the like. Because the same array is used to collect both the pulse return and the image, the two images are inherently aligned.

In one embodiment, a rapid sequence of images is such that ideally the pulse image is captured into one set of wells (capacitors) and the scene image is captured into a second set of wells. This is done as rapidly as possible and then read out at a more leisurely rate. Having the two sets of wells eliminate the need to wait for the pulse detection frame to be read out prior to collection of the image frame.

In one embodiment, the imager is dimensioned to match the output dimension of a fiber optic taper. A fiber optic taper is formed by compressing one end of a set of optic fibers. This causes an image input on the narrow end of the taper to expand at the larger end of the taper. The size of the image array is typically limited by the capability of the taper to expand the image to match the imager dimension and the physical dimensions of the imager pixels. In one embodiment, an array of 320×320 pixels is used.

The length of the scene image capture integration time would ideally be set as long as possible. Ideally this would be based on an automatic gain control loop that ensures that the image does not saturate at high noon, yet the integration time is maximized for low light (night time) operation. Another possible constraint is that a long integration time will introduce additional smear. The maximum integration time may therefore be subject to the amount of image motion introduced by the dynamics of the round, for example.

Referring to FIG. 1, a cross-sectional diagram of one embodiment of a dual mode semi active laser seeker and imaging system according to the principles of the present disclosure is shown. More specifically, a round (1) has wings (3) and the wings (3) are preferably deployed after launch in order to protect any sensors on the leading edge of the wings from adjacent rocket exhaust. In some embodiments, there are two wings, in some there are three or four (as shown in the FIG. 1). In this embodiment, at least some of the wings hosts an aperture (5) to be used for designator pulse discrimination. In one case, each aperture correlates to a pixel so that a quad cell is approximated by combining the output of the single pixels from the four wings. The apertures (5) are designed such that the light collected from a source varies with the angle of incidence on the aperture. The apertures (5) are typically pointed such that their boresights are distributed on a circle pattern with a radius having half of the radius of the desired field of regard. The information from the light collected in the four apertures (5) distributed amongst the four wings (3) will be used to determine an angle to the target using methods based on relative weight of the light collected amongst these apertures. One or more of these wings (3) may also host another wing aperture also referred to as an imager (7) to be used to collect a high resolution image data of the scene. In certain embodiments, aperture size the pulse detection sensors is a trade between a large aperture to enhance detection range versus a small aperture to minimize aerodynamic drag. The aperture need not be circular so it can be long to coincide with the geometry of the wing in order to maximum range performance. This would not be case for a quad cell implementation which typically retains symmetry.

The apertures in one example include a bandpass filter that is optimized to the designator wavelength. One typical wavelength is 1064 nanometers. There are other wavelengths between 1400 and 1600 nanometers that are also used.

Figure 2:
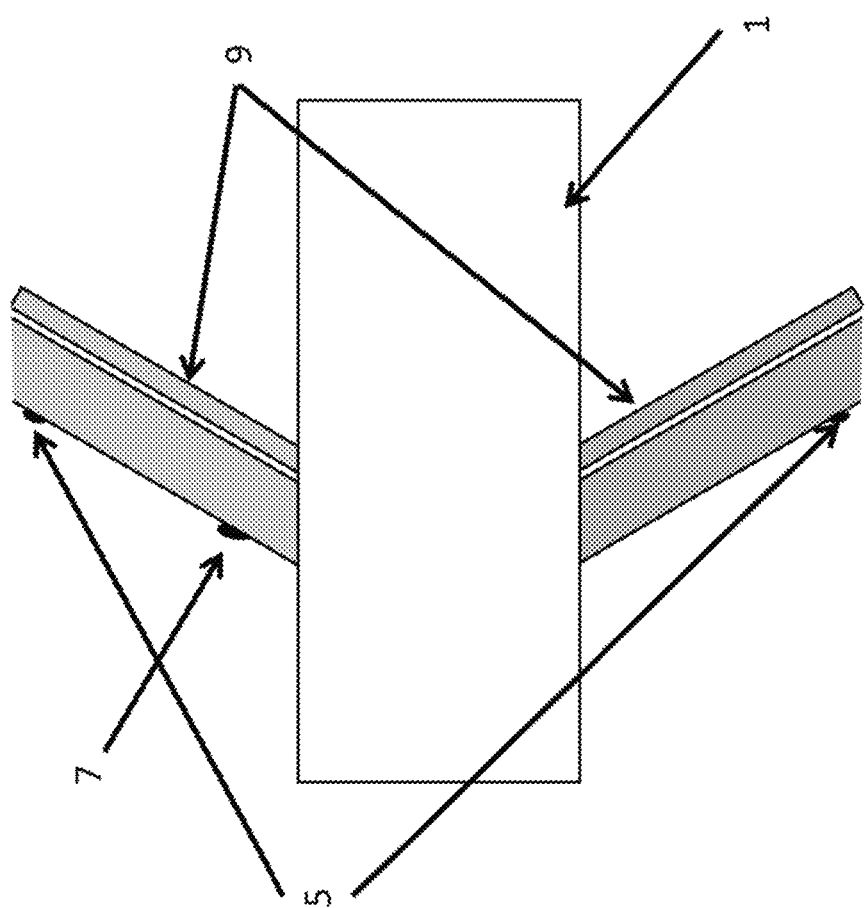
FIG. 2 shows a partial side diagrammatic view of one embodiment of a dual mode semi active laser seeker and imaging system located mid-body according to the principles of the present disclosure.

Referring to FIG. 2, a partial side diagrammatic view of one embodiment of a dual mode semi active laser seeker and imaging system located mid-body according to the principles of the present disclosure is shown. The apertures (5) as well as the additional wing aperture (7) are shown. More specifically, each wing of the round (1) has a flaperon (9) that can be independently set in order to control the roll orientation of the round as well as the angle of attack of the round in order to control the round to target interception.

Figure 3:
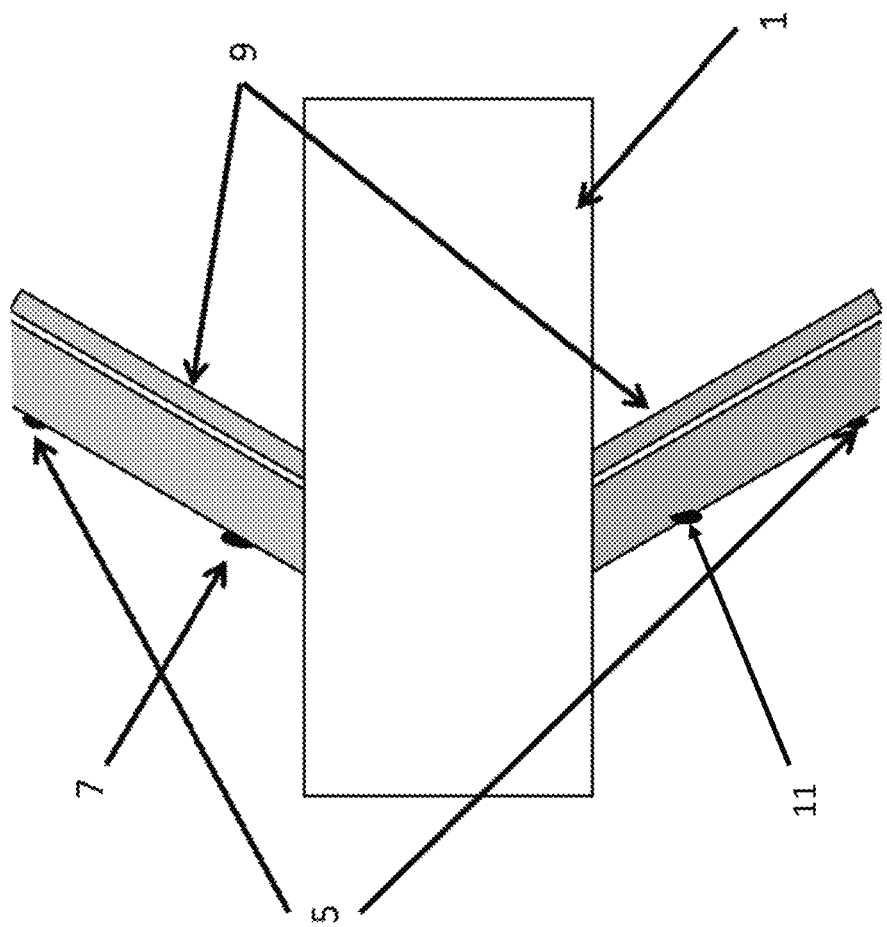
FIG. 3 shows a partial side diagrammatic view of another embodiment of a dual mode semi active laser seeker and imaging system located mid-body according to the principles of the present disclosure.

Referring to FIG. 3, a partial side diagrammatic view of another embodiment of a dual mode semi active laser seeker and imaging system located mid-body according to the principles of the present disclosure is shown. More specifically, in some cases, depending on projectile dynamics and engagement scenarios, an additional camera (11) or multiple cameras may be required in order to maintain lock on a target due to obscuration by the round body (1) due to variation in angle of attack while under guided flight. Alternatively, the additional camera (11) may be sensitive to a different waveband. For instance one aperture (7) could use a camera sensitive to the SWIR band in order to optimize daytime performance in lowered visibility while a second aperture (11) could use a camera sensitive to the LWIR band for night time operation.

One example described here is specific to the implementation on a mid-body guidance section where the multiple sensors are attached to deployable wings. The wings therefore each interface to at least one separate detector within the body which, when combined, effectively act as a quad cell. The relative amplitude of the received signal on the apertures is used to determine a rough angle to target used to orient the round to ensure that the pulse is observable by the imaging aperture. In this arrangement the sensor apertures are protected against storage and handling environments as well as adjacent rocket fire. Mounting to the wings avoids additional pop-outs from the body which add to drag and can degrade system aerodynamic performance.

According to the principles of the present disclosure, an imaging system is cued by a semi active laser (SAL) seeker. The imaging system captures a short integration image using a temporal gate, which is part of the discrimination process for designator detection. This is rapidly followed by a long integration used for scene capture. In some cases, the system is implemented with apertures in the wings. Captured light is relayed to the mid body which houses the camera and one or more SAL detectors. Relaying of the image in this way avoids the need for additional pop-outs from the body and isolates the one or more detectors from thermal environments due to aerodynamic heating.

Figure 4:
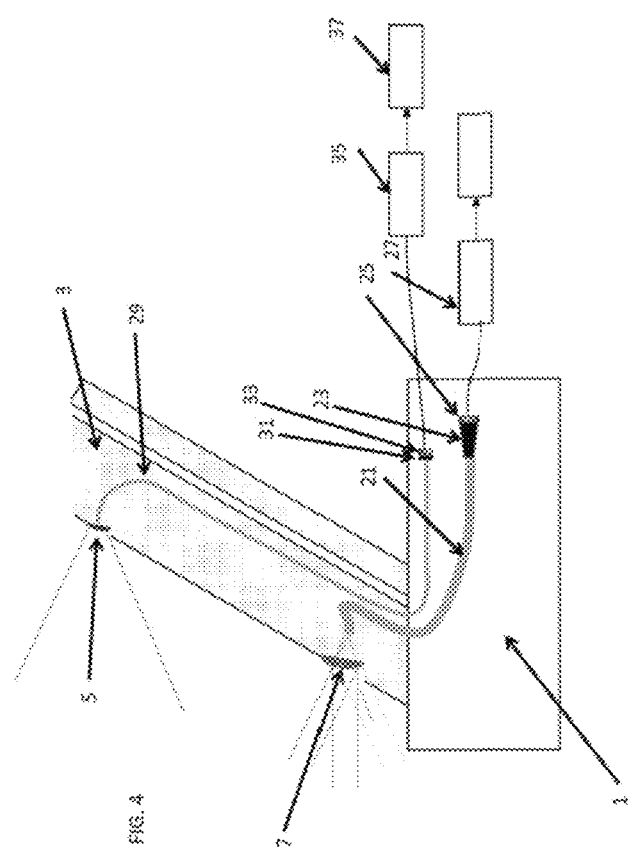
FIG. 4 shows a partial side diagrammatic view of one embodiment of a dual mode semi active laser seeker and imaging system located mid-body according to the principles of the present disclosure.

Referring to FIG. 4, a partial side diagrammatic view of one embodiment of a dual mode semi active laser seeker and imaging system located mid-body according to the principles of the present disclosure is shown. More specifically, the figure further illustrates components internal to the wing (3) and round body (1). In one embodiment, the camera aperture (7) consists of a lens which focuses the scene to the face of a fiber optic cable (21). This fiber optic cable (21) may be of the type such as used for medical imaging, made up of a bundle of discrete fibers whose relative placement is aligned at both the input and output of the cable. This allows for the high fidelity transmission of a focused image through a flexible interface from the wing (3) to a focal plane (25).

While it may be possible to size the cable to match the focal plane dimensions, a further approach is to use a fiber optic taper (23) to expand the fiber dimensions to match the focal plane area. The focal plane is then interfaced to a ROIC (27) to capture the image.

Still referring to FIG. 4, one of the wing mounted pulse detection apertures (5) is shown. This aperture consists of an optical lens that captures light within the required FOV and focuses that light onto a second fiber bundle (29). While this fiber bundle (29) does not need to be made up of multiple fibers since the intention is not to capture an image but rather to capture all of the light over a defined FOV, it is preferably implemented as a bundle of smaller fibers in order to maintain flexibility across the wing-body boundary. Each of the fiber bundles (29) from the wings interface to a single detector pixel (33) after passing through a filter (31). The four wings therefore each interface to a separate detector within the body which, when combined, effectively act as a quad cell. The relative amplitude of the received signal on the apertures is used to determine a rough angle to target used to orient the missile to ensure that the pulse is observable by the imaging aperture. In certain embodiments, the filter (31) is a narrow bandpass filter tuned to the designator wavelengths of interest.

Alternatively, this filter (31) could be placed after the optical element or deposited on the optical element itself. The filter reduces the noise due to background radiation not coincident with the known designator frequency in order to enhance detection range and angle accuracy for the pulse detection function. Note that while the pulse detection apertures each interface to a single detector pixel (33), one implementation of this detector would be to use a four pixel array which was grown as a single detector array in order minimize process variations to ensure optimum response uniformity.

In one embodiment, the outputs of the detector pixels (33) are processed by an analog front end (35) that amplifies the signal and samples the amplified signal using a 10 MHz A/D converter. The digitized data is processed by a pulse discrimination and angle processor (37). This processor matches the detected pulses to an anticipated pulse sequence dictated by the designator code selected by the designator. As typical with these systems, once a pulse is detected this process samples subsequent pulses within tight timing windows. In some cases, the angle measurement output of this system is insufficient for guidance due to the poor resolution. However, the angle measurement output of this system provides sufficient accuracy such that the round can be commanded to roll the imaging aperture to an orientation in which the designator can be observed. The ROIC (27) receives a timing signal from the pulse discrimination and angle processor (37) which initiates the start of integration ensuring the designator pulse is captured.

Figure 5:
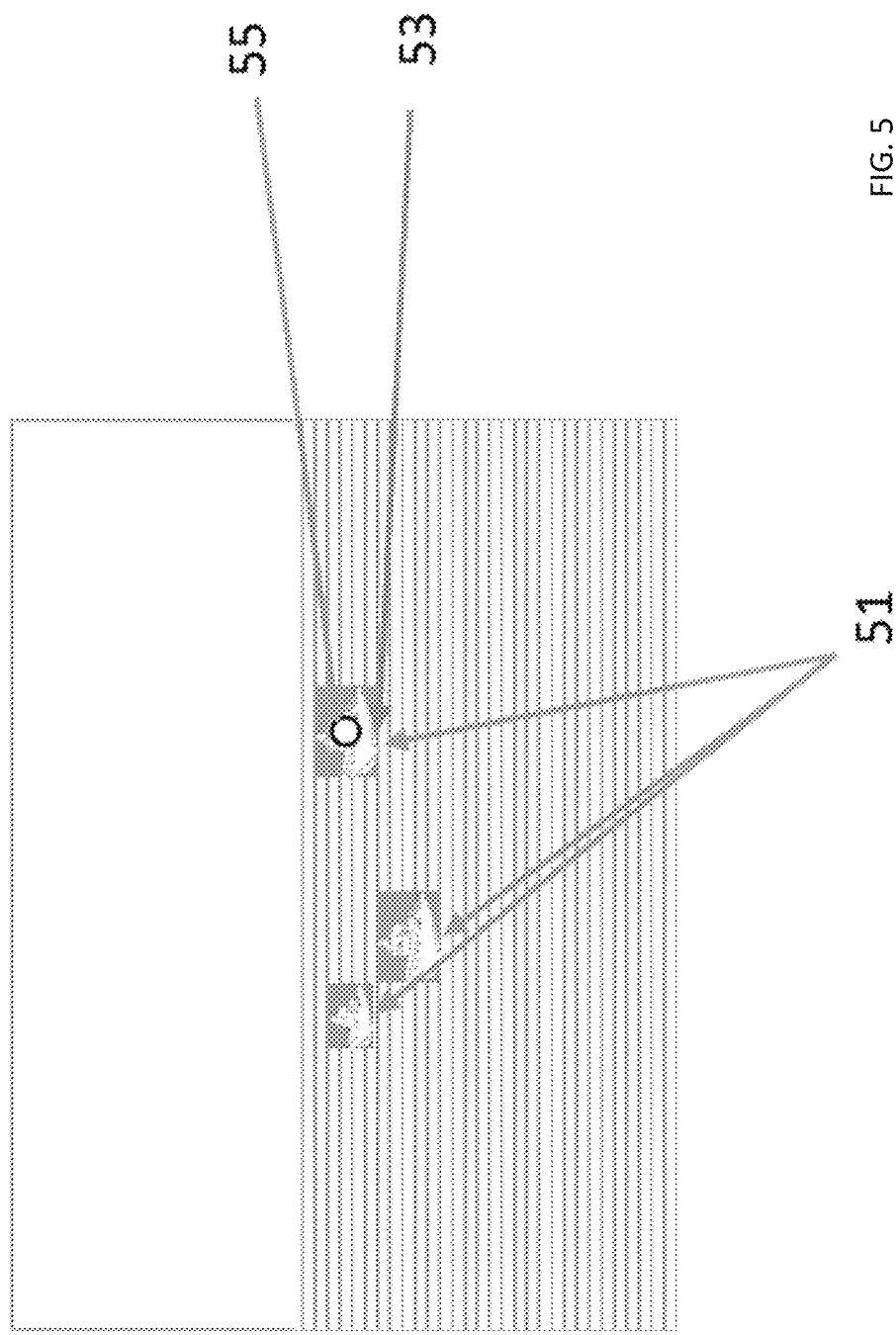
FIG. 5 is a diagrammatic representation of an image of a scene as captured by one embodiment of a dual mode semi active laser seeker and imaging system according to the principles of the present disclosure.

Referring to FIG. 5, a diagrammatic representation of an image of a scene as captured by one embodiment of a dual mode semi active laser seeker and imaging system according to the principles of the present disclosure is shown. More specifically, a resulting captured image is illustrated. The imaging array provides an image of the scene which includes targets (51). The designator selects the target of interest (53) and points the designator such that the target is illuminated by the laser (55). This allows the system to identify the target of interest, anointing the target such that if the designator is subsequently turned off, the system can continue to sense and guide the round to the target (53).

A system of this design is also beneficial in situations where it may difficult to maintain the designator on target, such as designation of a small boat in the presence of waves. Once acquired by the image system, the target can subsequently be tracked by the imaging system without assistance from the designator. In order to ensure proper selection of the target, the angle information provided by the pulse discrimination and angle processor (37) may be used to select amongst multiple returns. The gating of the short image collection ensures proper selection of the target. The angle information provided by the angle processor is intended to provide sufficient information to ensure that the imaging system can observe the target within its field of view.

In one embodiment, the processor includes analog electronics that provide a low-noise transimpedance amplifier interface to the detector to convert detector current to a voltage followed by a variable gain stage to account for the large dynamic range required over the engagement due to closing range. This is followed by a high speed analog to digital converter (e.g., 10 MHz or higher). This is provided to a processor and/or FPGA to perform pulse detection processing based on angle measurement.

Referring to FIG. 6A and FIG. 6B, diagrammatic representations of a pulse image and a target image, respectively, according to the principles of the present disclosure are shown. More specifically, in one embodiment the ROIC (27) captures an image with a short integration time followed by an image capture at a longer integration time in order to capture the scene. The initial short integration time is optimum from the standpoint of signal to noise on the pulse capture. The pulse is extremely short relative to the likely desired integration period for image capture and can easily be lost in the shot noise which increases with integration time. A shorter integration period is not optimum for image scene image capture. Using a combination of a short integration time for pulse capture followed by a long integration time for target image capture, the pulse and target image can be captured separately while preserving the inherent registration accuracy between the pulse image (55) and the target image (53). The short integration time for pulse detection also ensures that multiple designators do not lead to confusion relative to which target is the target of interest.

Referring to FIG. 7, a flow chart of one embodiment of a method of the present disclosure is shown. More specifically, the dual mode semi active laser seeker and imaging system utilizes standard techniques for pulse detection and angle determination as applied to quad detectors in order to properly identify the correct designator spot. Angle performance is not dictated by guidance requirements, but is only driven by the field of view of the imaging system. The imaging system resolution provides the required angle accuracy for guidance as cued by the pulse detection apertures. The imaging system eliminates the need to designate until impact eliminating exposure to counter fire against the designator. The elimination of designation until impact also opens up the opportunity rapid engagement of multiple targets from a single designator.

Still referring to FIG. 7, one embodiment of a method for dual mode target tracking, is used on a round comprising a plurality of wings, wherein each wing has an aperture. Light is collected to determine an angle to a target based on relative weight of the light collected amongst the plurality of apertures 100 to discriminate a pulse from a designator 102. In one embodiment, at least one imager on a wing is used, where the imager is configured to collect a high resolution image of a scene 104. An on-board processor is configured to detect the designator 106; set a temporal gate around an anticipated arrival time of a subsequent pulse based on a pulse code 108; and trigger the imager to being collection of two images in rapid sequence 110. A first or pulse image, having a short integration time, is used to capture a designator pulse against a background. A second or target image, having a longer integration time, is used to capture both feature and target detection. The sequence of images align the designator pulse to the target image 110 for use in target tracking.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A dual mode target tracking system, comprising:
   a round comprising a plurality of wings, wherein each wing has at least one aperture configured to collect light and discriminate a pulse from a designator;
   at least one of the plurality of wings having an imager configured to collect a high resolution image of a scene; and
   an on-board processor configured to:
   determine an angle to a target based on relative weight of the light collected amongst the plurality of apertures;
   detect the designator; and
   trigger the imager to begin collection of at least two images in sequence,
      wherein the first of the at least two images is collected by the imager with a first integration time, the second of the at least two images is collected by the imager with a second integration time, and wherein the second integration time is greater than the first integration time;
      wherein the first and second integration times are set such that the first image collects data indicative of a designator pulse and the second image collects data indicative of features and targets; and
      align the first and second images.

2. The system according to claim 1, wherein the plurality of apertures is four.

3. The system according to claim 1, wherein the short integration time is set to 100 nanoseconds, 5× the designator pulse width of 20 nanoseconds, in order to ensure that the short designator pulse is not lost against shot noise due to accumulated background.

4. The system according to claim 1, wherein the second image is collected immediately after the first image and the integration time for the second image is set based on an automatic gain control process that ensures that the imager is not saturated due to ambient light conditions.

5. The system according to claim 1, further comprising a fiber optic cable internal to the wing and coupling the imager to a focal plane.

6. The system according to claim 1, further comprising a fiber optic cable internal to the wing and coupling the aperture to a detector.

7. The system according to claim 1, wherein the aperture is a camera sensitive to a LWIR band.

8. The system according to claim 1, wherein the aperture is a camera sensitive to a SWIR band.

9. The system according to claim 1, further comprising at least one additional camera on the wing.

10. A method for dual mode target tracking, comprising:
    providing a round comprising a plurality of wings, wherein each wing has an aperture configured to collect light and discriminate a pulse from a designator;

providing at least one imager on a wing the imager being configured to collect a high resolution image of a scene; and providing an on-board processor configured to:
- determine an angle to a target based on relative weight of the light collected amongst the plurality of apertures;
- detect the designator; and
- trigger the imager to begin collection of at least two images in sequence,
  - wherein the first of the at least two images is collected by the imager with a first integration time, the second of the at least two images is collected by the imager with a second integration time, and wherein the second integration time is greater than the first integration time;
  - wherein the first and second integration times are set such that the first image collects data indicative of a designator pulse and the second image collects data indicative of features and targets; and
  - align the first and second images.

11. The method according to claim 10, wherein the plurality of apertures is four.

12. The method according to claim 10, wherein the short integration time is set to 100 nanoseconds, 5× the designator pulse width of 20 nanoseconds, in order to ensure that the short designator pulse is not lost against shot noise due to accumulated background.

13. The method according to claim 10, wherein the second image is collected immediately after the first image and the integration time for the second image is set based on an automatic gain control process that ensures that the imager is not saturated due to ambient light conditions.

* * * * *